United States Patent
Sommer et al.

(10) Patent No.: US 8,036,147 B2
(45) Date of Patent: Oct. 11, 2011

(54) METHOD FOR TRANSMITTING LCAS PROTOCOL VIA AN OPTICAL COMMUNICATION LINE

(75) Inventors: Ronen Sommer, Givatayim (IL); Eitan Yehuda, Zoran (IL)

(73) Assignee: ECI Telecom Ltd., Petach Tikva (IL)

( * ) Notice: Subject to any disclaimer, the term of this patent is extended or adjusted under 35 U.S.C. 154(b) by 955 days.

(21) Appl. No.: 11/994,098

(22) PCT Filed: Jun. 15, 2006

(86) PCT No.: PCT/IL2006/000691
§ 371 (c)(1),
(2), (4) Date: Dec. 27, 2007

(87) PCT Pub. No.: WO2007/000753
PCT Pub. Date: Jan. 4, 2007

(65) Prior Publication Data
US 2008/0205890 A1    Aug. 28, 2008

(30) Foreign Application Priority Data
Jun. 27, 2005   (IL) .......................................... 169416

(51) Int. Cl.
*H04B 1/44* (2006.01)
(52) U.S. Cl. ......... 370/282; 370/437; 370/458; 370/477
(58) Field of Classification Search .................. 370/282, 370/431, 437, 458, 460, 477
See application file for complete search history.

(56) References Cited

U.S. PATENT DOCUMENTS
2004/0252633 A1*  12/2004  Acharya et al. ............... 370/216
2006/0067235 A1*   3/2006  Acharya et al. ............... 370/238

FOREIGN PATENT DOCUMENTS
WO     2006032608 A    3/2006

OTHER PUBLICATIONS

Choy L: "Virtual Concatenation Tutorial: Enhancing Sonet/SDH Networks for Data Transport" Journal of Optical Networking, vol. 1, No. 1, Jan. 2002, pp. 18-29.

ITU-T G.7042/Y.1305 (Feb. 2004): "Link capacity adjustment scheme (LCAS) for virtual concatenated signals" International Telecommunication Union, Geneva, CH, Feb. 2004, chapter 6, plus amendments of Feb. 2005, May 18, 2005 and Aug. 2005.

(Continued)

*Primary Examiner* — Luat Phung
(74) *Attorney, Agent, or Firm* — Browdy and Neimark, PLLC

(57) ABSTRACT

A technique for exchanging LCAS control information between a first network element and a second network element interconnected by a bi-directional optical communication line, while conveying substantially unidirectional data traffic in the form of a virtual concatenated group (VCG) binary stream transmitted in a first direction via the bi-directional optical communication line, the technique comprising: —in the first direction, transmitting the LCAS control information via the bi-directional optical communication line in the VCG binary stream, by placing the information in one or more overhead bytes conventionally specified for the VCG binary stream, —in a second (opposite) direction, transmitting the LCAS control information in an existing binary stream non-related to the above-mentioned unidirectional data traffic; the existing binary stream should pass via a communication trail connecting the first network element and the second network element but not obligatory coinciding with the above-mentioned line; the discussed information should be placed in one or more overhead bytes of the existing binary stream.

7 Claims, 4 Drawing Sheets

OTHER PUBLICATIONS

ITU-T G.707/Y.1322: "Network node interface for the synchronous digital hierarchy (SDH)" International Telecommunication Union, Geneva, CH, Dec. 2003.

ITU-T G.783: "Characteristics of synchronous digital hierarchy (SDH) equipment functional blocks" International Telecommunications Union, Geneva, CH, Mar. 2006.

ITU-T G.80+/Y.1331: "Interfaces for the Optical Transport Network (OTN)" International Telecommunications Union, Geneva, CH, Mar. 2003.

ITU-T G.798: "Characteristics of optical transport network hierarchy equipment functional blocks:" International Telecommunications Union, Geneva, CH, Dec. 2006.

* cited by examiner

METHOD FOR TRANSMITTING LCAS PROTOCOL VIA AN OPTICAL COMMUNICATION LINE

FIELD OF THE INVENTION

The invention relates to transmission of LCAS protocol by SDH, SONET or OTN frames in corresponding communication networks.

BACKGROUND OF THE INVENTION

The use of Link Capacity Adjustment Scheme (LCAS) for virtual concatenated signals is described in the ITU-T Standard Recommendation G.7042. The Recommendation specifies a link capacity adjustment scheme that should be used to increase or decrease the capacity of a container that is transported in an SDH/OTN network using Virtual Concatenation. The scheme is applicable to every member of the Virtual Concatenation group.

This Recommendation defines the required states at the source and at the sink side of the link as well as the control information exchanged between both the source and the sink side of the link to enable the flexible resizing of this Virtual Concatenated signal. The actual information fields used to convey the control information through the transport network are defined in their respective Recommendations, which are ITU-T Recs G.707/Y.1322 and G.783 for SDH and ITU-T Recs G.709/Y.1331 and G.798 for OTN which are also called OTH—Optical Transport Hierarchy.

For example, in SDH/SONET frames, control information concerning LCAS protocol is transmitted by means of POH (Path Overhead) bytes of a standard SONET/SDH transport module. In OTH, such LCAS control information is normally transmitted in OPU-k virtual concatenation overhead (VCOH 1/2/3).

LCAS, in the virtual concatenation source and sink adaptation functions, provides a control mechanism to smoothly increase or decrease the capacity of a link to meet the bandwidth needs of the application. It also provides the capability of temporarily removing member links that have experienced a failure. The LCAS assumes that in cases of capacity initiation, increase or decrease, the construction or destruction of the end-to-end path of each individual member is the responsibility of the Network and Element Management Systems.

Synchronization of changes in the capacity of the transmitter (So) and the receiver (Sk) shall be achieved by a control packet. Each control packet describes the state of the link during the next control packet. Changes are sent in advance so that the receiver can switch to the new configuration as soon as it arrives.

It should be noted that LCAS protocol is transmitted between a source and a destination via the transport network as control information. Since transmission via the communication link is usually bi-directional, a so-called hand-shaking procedure is required to maintain the transmission. Therefore, the control information concerning LCAS protocol is transmitted by means of overhead bytes (such as POH bytes of SDH data frame), and in both directions of any bi-directional link.

In cases of substantially unidirectional data traffic, data flow in the opposite direction of a bi-directional link is almost negligible. Such situations are typical for video on demand applications, when, according to a customer's order, massive data flows carry the ordered video information in one transmission direction via the communication link. Another example of a unidirectional data traffic is any kind of e-learning process when heavy data traffic is transferred to a client (in one transmission direction) upon his/her single momentary request (in the opposite direction). In these cases, the need of transmitting LCAS in the mentioned opposite direction results in forwarding almost or completely empty SDH/SONET or OTN transport modules just for the purpose of transporting some informative overhead bytes thereof. Consequently, bandwidth capacity of the communication link is utilized non-effectively in such cases.

SUMMARY OF THE INVENTION

It is therefore the object of the invention to provide a method of effective utilizing of bandwidth capacity in optical communication lines when LCAS protocol is used.

Other objects of the invention will become apparent as the description of the invention proceeds.

In all presently known systems, LCAS protocol is transmitted using overhead bytes in SDH/SONET or OTN frames (virtual containers of concatenated groups) traveling in both transmission directions of a bi-directional optical line connecting two communicating network elements.

There is presently proposed a method of exchanging LCAS control information between a first network element and a second network element interconnected by a bi-directional optical communication line, while conveying substantially unidirectional data traffic in the form of a virtual concatenated group (VCG) binary stream transmitted in a first direction via said bi-directional optical communication line, the method comprises the following arrangement for exchanging the LCAS control information:
  a) in the first direction, transmitting the LCAS control information via said bi-directional optical communication line in said VCG binary stream, by placing the LCAS control information in one or more overhead bytes conventionally specified for said VCG binary stream,
  b) in a second direction being opposite to said first direction, transmitting the LCAS control information in an existing binary stream non-related to said unidirectional data traffic and passing in the second direction via a communication trail connecting said first network element and said second network element, by placing said LCAS control information in one or more overhead bytes of said existing binary stream.

In the first direction, the LCAS control information is transmitted according to presently effective standards, for example—in each member stream path overhead (POH) in SDH/SONET networks (or in an equivalent portion of standard frames in OTH network).

Preferably, the one or more overhead bytes of said existing binary stream are not the one or more bytes conventionally specified for said VCG binary stream. Most preferably, the one or more overhead bytes of said existing binary stream are overhead bytes not specified for transporting LCAS control information in any VCG binary stream.

In the frame of the present description, LCAS control information is to be understood as a succession of LCAS control packets.

For the purpose of our description, the term VCG binary stream should be understood as a group of member streams, wherein the group comprises one binary stream or two or more binary streams, and wherein each of said member streams is respectively formed by a succession of equal transport modules (virtual containers); the member streams being transmitted via parallel routes from one of said first network element (NE1) and second network element (NE2) to the other of said two network elements (NE). The VCG binary stream is understood as formed of transport modules suitable for a communication network selected from a non-exhaustive list comprising SDH, SONET, OTH networks.

It should be noted that each of said communication line and the communication trail may comprise one or more communication links, i.e. each of them may include additional network elements NE between the first network element NE1 and the second network element NE2.

For SDH communication network, an example of a VCG binary stream is a plurality of one or more virtual containers (transport modules) VC-n (n=3, 4, 12), which are carried by standard frames STM-k (k=1, 4, 16, 64, . . . ), for example as follows:

STM-4 may comprise up to four concatenated VC-4;
STM-16 may comprise up to 16 concatenated VC-4;
STM-64 may comprise up to 64 concatenated VC-4.

For SONET networks, equivalent transport modules and VCG groups exist, known to those skilled in the art, and thus can be not referred to in the present description.

For OTH, there are VCG data streams composed from transport modules called OPU-k, were the index "k" represents bit rate (k=1 represents bit rate of about 2.5 Gb/sec, k=2 represents bit rate of about 110 Gb/sec, k=3 represents bit rate of about 40 Gb/sec according to standard Recommendations G.709/Y.1331 and G.798).

The term "conventionally specified overhead bytes" should be understood as bytes specified by one or another above-mentioned standard recommendation (concerning SDH, SONET or OTH) for carrying the LCAS control information.

In SDH, the conventionally specified overhead byte is, for example, byte H-4 in a Path Overhead (POH) portion of the virtual container VC-4, according to the ITU-T Standard Recommendation G.707.

In OTH, the conventionally specified bytes are bytes in VCOH 1/2/3 according to the ITU-T Standard Recommendation G.709.

In the above definition of the proposed method, the mentioned communication trail may be either a part of said bi-directional communication line, or a separate communication trail (link, path) existing in the network, connecting the first network element and the second network element, and carrying traffic not related to the mentioned VCG stream of the first direction. According to the invention, the role of such a communication trail is in that it already carries any suitable traffic (i.e., said pre-existing binary stream) which may "give a lift" to the LCAS control information and thus to transport it in the required second direction. For the VCG binary stream that has been initially transmitted via the bi-directional line, the function of LCAS will thereby be fulfilled in both directions.

The binary stream existing between the first and the second network elements in the second direction but not related to the unidirectional traffic may be, for example:

a) a VCG stream of the type similar or different from the VCG binary stream transmitted in the first direction,
b) a single binary stream, acceptable in the communication network comprising said bi-directional communication line, wherein said single stream is not a member of any VCG.

As has been noted above, transmitting the LCAS control information in the existing binary stream should preferably be performed using overhead bytes, being different from the conventionally specified bytes. This approach is especially useful for the case where the communication trail just forms part of the bi-directional communication line for transmitting traffic in the second direction.

Such "different" overhead bytes may be unused bytes of so-called Section Overhead (SOH) portion of the standard STM-n frame of SDH network. For example, there are bytes called MS-DCC, RS-DCC bytes in the SOH overhead portion, which can be utilized for transportation of LCAS control information. MS-DCC and RS-DCC are respectively positioned in Multiplexed Section Overhead (MSOH) and Regeneration Section Overhead (ROH) being parts of the SOH section of the SDH/SONET standard transport module.

For OTH transport modules, such reserve overhead bytes, for example, are located in row 2 intersections with columns 1, 2, 3; in row 4 intersections with columns 9 to 14. Said reserve overhead bytes or other unused overhead bytes in the OTH transport modules can be used for the purpose of transporting "the foreign" LCAS control information.

Owing to the proposed arrangement, the second direction of the bi-directional communication line (the first direction of which is occupied by the unidirectional VCG binary stream) is freed from allocating special transport modules just for transmitting the LCAS control information. In other words, there is no need in spending considerable bandwidth for especially transmitting a succession of transport modules being almost empty. Due to this saving, bandwidth available on the bi-directional communication line can be spent more judiciously, for example be assigned in advance to other users. If needed, traffic of such users (non-related to the unidirectional traffic) may be successfully used as the existing binary stream for lifting some additional auxiliary information—namely the LCAS control information.

As has been mentioned, the LCAS control information can be transmitted in the second direction by utilizing any other, be it called alternative or additional communication trail connecting the first network element and the second network element and by using any traffic (binary stream) existing in the required, second direction on this communication trail. Such existing traffic is definitely not related to our "problematic" unidirectional traffic.

As mentioned above, the LCAS control information can be placed in overhead bytes (preferably, reserve overhead bytes of the pre-existing traffic).

However, other overhead bytes (even the conventionally specified ones) can be used for transporting LCAS control information over an existing binary stream (not related to the unidirectional VCG) via the alternative communication trail. In this case, the existing binary stream is preferably a single binary stream or a number of single binary streams not being member(s) of any VCG.

The proposed method is initiated and performed under supervision of a Network Management System (NMS) of the network. The NMS is aware of the network topology and is therefore capable of allocating an alternative communication trail (path) in the communication network to which the NE1 and NE2 belong. NMS may be adapted to allocate a suitable communication trail via the mentioned communication network, and sometimes even via additional neighboring network. The condition for selecting such a trail would be that the trail connects the NE1 and NE2 and conducts any existing traffic in the second direction. Also, during transmitting the existing traffic via any number of network elements, the trail in the required second direction must transparently convey the LCAS control information inserted at one (say, $1^{st}$) network element while passing the whole communication trail up to the other (say, $2^{nd}$) network element.

There is also provided an Element Management System (EMS), possibly acting in cooperation with the above NMS. The EMS should allow (a user) to select position where to insert LCAS control information into the existing binary stream in the second direction, should assist the insertion and should allow recovering LCAS control information upon being received from said second direction.

According to a further aspect of the invention, there is provided a communication network, capable of performing the above-described method.

The network is preferably equipped with the NMS and/or EMS, capable of controlling network nodes of the network for performing the above-described method.

According to still a further aspect of the present invention, there is provided a program product, preferably constituting at least part of the NMS and/or EMS software system, and comprising software instructions which, being run on a computer, are capable of performing the above-described method at network nodes of a communication network.

DETAILED DESCRIPTION OF THE INVENTION

Figure 1A:
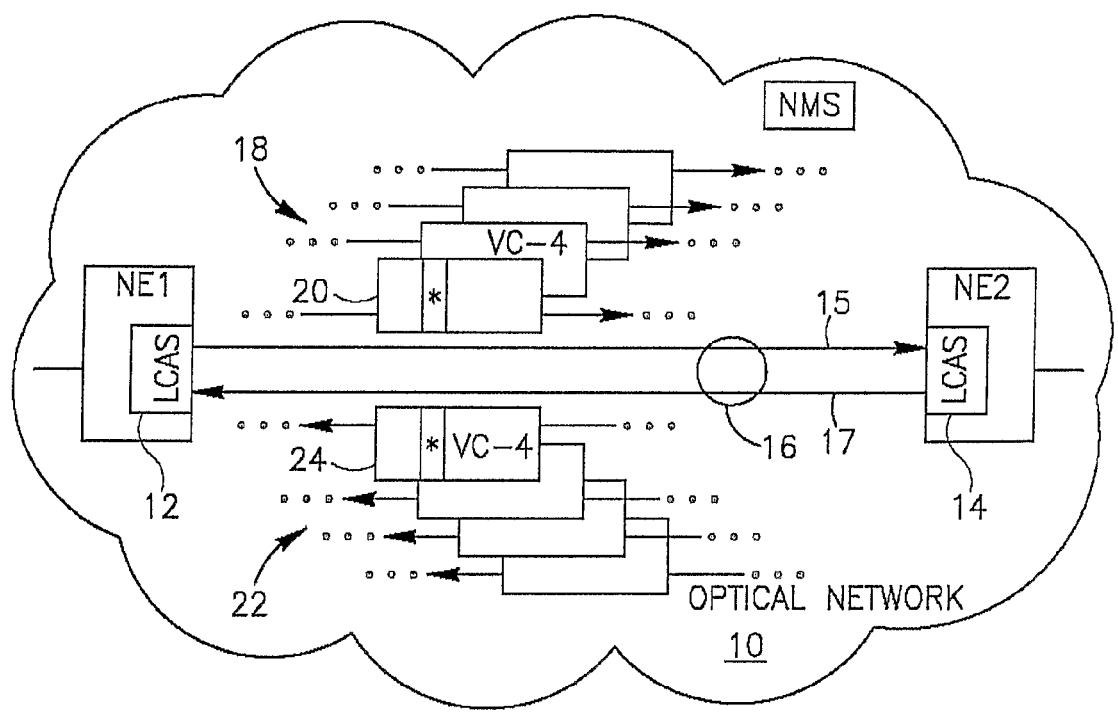
FIG. 1A (prior art) illustrates a schematic block diagram of the standardized transmission of LCAS control data within a Virtual Concatenated Group binary stream via a bi-directional communication link.

FIG. 1A (prior art) illustrates a conventional method of transmitting LCAS control information in a Virtual Concatenated Group binary stream between a first network element NE1 and a second network element—NE2 in an optical network 10. LCAS device in NE1 is marked 12, the analogous LCAS device in NE2 is marked 14. Let the two network elements are connected by a bi-directional communication line 16 which consists of two pluralities of links or paths: one plurality (15) comprises one or more links (paths) capable of conveying traffic in a first direction, let it be from NE1 to NE2, and the other plurality (17) comprises links or paths for carrying traffic in the second direction, from N2 to N1. The meaning of the term "path" is in that the network elements NE1 and NE2 may be interconnected not directly, but via other network elements which are not shown in the figure.

For the sake of simplicity, only one sub-link (sub-path) 15 is shown, that conveys traffic in the first direction, and one sub-link 17 is illustrated as carrying traffic in the second direction. Suppose that the traffic via the line 16 is substantially bi-directional.

FIG. 1A schematically illustrates a Virtual Concatenated Group (VCG) binary stream marked 18, consisting of four member streams formed by virtual containers VC-4 (20) that are transmitted in parallel via four sub-paths (only one of them 15 is shown). LCAS control information concerning the line status is inserted in each VC-4 Path Overhead (POH) portion H4 byte and is marked with an asterisk.

FIG. 1A also illustrates traffic in the second direction from NE2 to NE1, in the form of a similarly shaped Virtual Concatenated Group binary stream marked 22 consisting of member streams 24. In this example, the stream 22 in the second direction is shown identical to the stream 18 in the first direction.

However, another type of a VCG binary stream can be used in the second direction say, formed from transport modules VC-3 can be used for the purpose of transmitting LCAS control information in the second direction. It should be noted that each sub-link of the bi-directional line 16 may constitute a physically separate link (path).

If we now suppose that the traffic 18 in the first direction is unidirectional (say, it carries video programs), then traffic 22 in the second direction will be practically absent. It then becomes clear that, only for transmitting LCAS control information in the second direction, at least one VC-4n stream must be formed and transmitted, even if payload of the VC-4m (m may be equal to or different from n) or remains empty (idle).

Figure 1B:
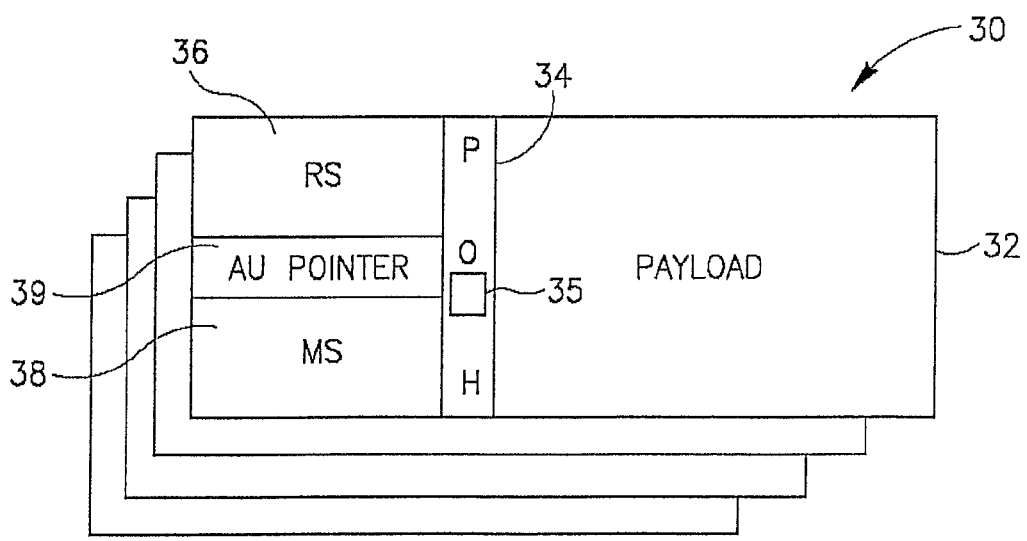
FIG. 1B (prior art) schematically illustrates a standard SDH data frame of a transport module of a VCG binary stream, and a standardized position in the overhead portion of the frame, where the LCAS control information may be inserted.

FIG. 1B (prior art) schematically illustrates a standard SDH frame 30, representing one transport module of a VCG flow (say, one VC-4 per S™ frame). The figure schematically illustrates that the VCG stream comprises a number of member streams transmitted in parallel. The frame comprises a predetermined number of bytes arranged in rows and columns, and is divided into standard sections: Payload 32 carrying data information, and a number of overhead bytes: POH (path overhead) bytes 34, RSOH 36, MSOH 38 and AU pointers 39. There is byte H4 (marked 35) in the POH section 34, which is conventionally specified (specified by standard) for transmitting control information concerning LCAS.

Figure 2:
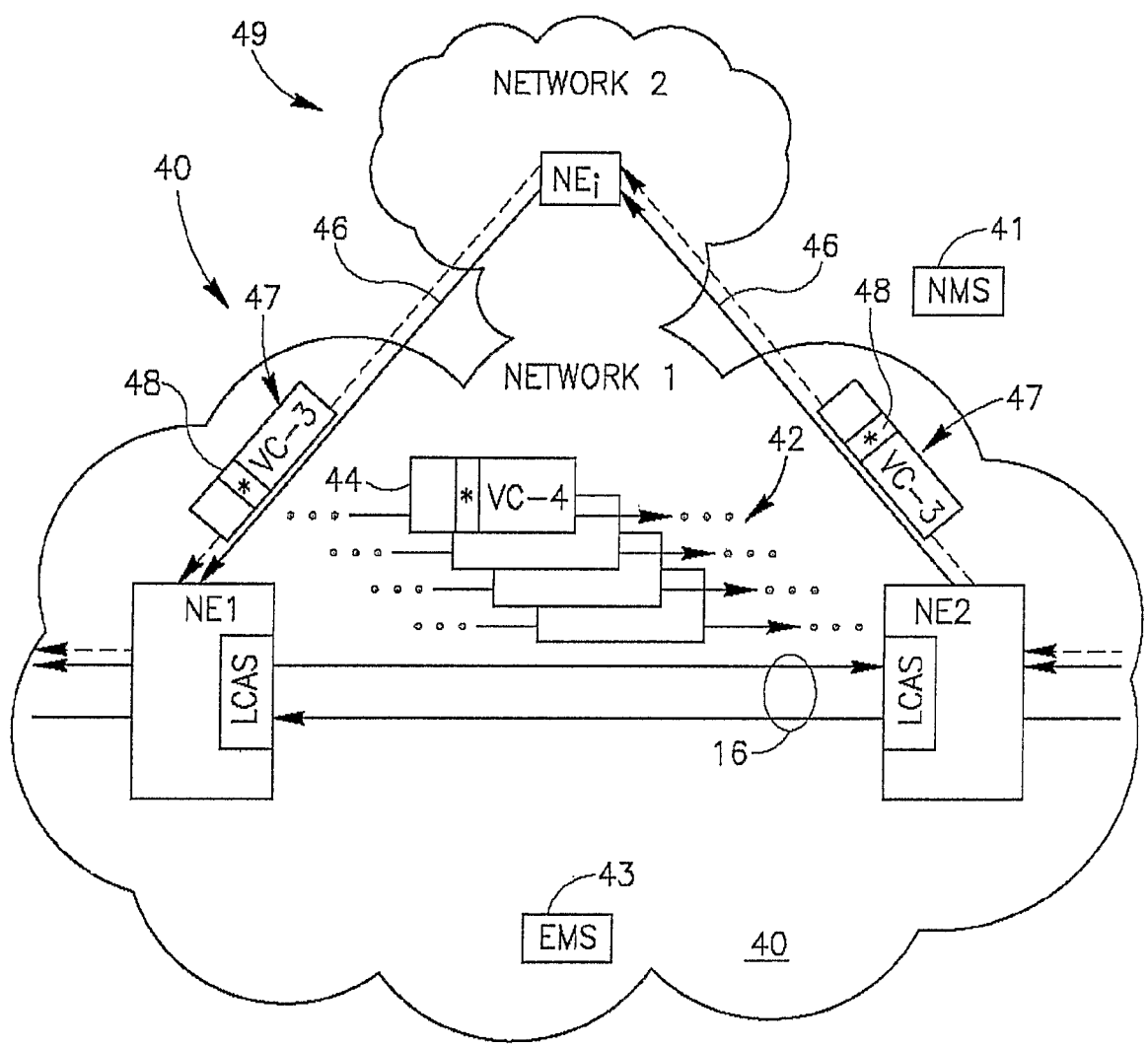
FIG. 2 is a block diagram schematically illustrating one version of the method according to the invention for exchanging LCAS control information in a case of unidirectional traffic, by using a communication trail between a source network element and a sink network element, carrying existing traffic unrelated to the unidirectional traffic.

FIG. 2 illustrates one arrangement for transmitting LCAS control information according to the invention. Elements, similar to those illustrated in FIG. 1a, are marked with similar numbers. In an optical communication network 40, provided with a common Network Management System NMS 41 and EMS 43 for a number of network elements, a bi-directional optical line 16 is provided between a network element NE1 and a network element NE2.

As in FIG. 1a, a VCG binary stream 42 is transmitted via the line 16 in the first direction, from NE1 to NE2. For the sake of example only, this stream is formed from virtual containers VC-4. As in FIG. 1a, in the first direction of the line 16, the LCAS control information is incorporated in overhead bytes of the POH portion, specified by standard, of a transport module 44 of the VCG 42. Let us suppose that the mentioned traffic is unidirectional, i.e., the second direction of the line 16 (though required for a number of purposes, including transmission of LCAS control information) is not used for transmitting data related to the binary stream VCG 42. Contrary to the conventional arrangement shown in FIG. 1A, the LCAS control information in the opposite, second direction (from NE2 to NE1) is not necessary transmitted via the same bi-directional link 16. In an example of this figure it is explicitly not; under supervision of NMS 41, the LCAS control information in the second direction is sent via an alternative communication trail 46, being separate from the bi-directional communication line 16. Any traffic, existing in the trail 46, passing from NE2 to NE1 in the network 40 and not related to the traffic 42 via the line 16, can be used for transporting LCAS control information concerning the line 16. For example, in the SDH network 40, while VC-4 containers of the VCG stream are transmitted in the first direction of the bi-directional communication line 16, a single stream 47 of VC-3 virtual containers exists, transmitted for carrying foreign data traffic in the second direction via a separate communication trail 46. This stream 47 can be used for carrying "the second direction" LCAS control information in respect of the line 16. For this purpose, one or more overhead bytes in the existing virtual containers 47 (either the conventionally specified bytes in the POH portion, or reserve bytes 48 in SOH portion) can be used.

Trail 46 may bypass via a number of additional network elements in said network, and even cross a section of a different communication network 49. The utility condition is that the LCAS information in the POH of VC-3 containers 47 is preserved or restored when the foreign existing traffic leaves the different communication network 49 and returns to the optical communication network 40.

Figure 3:
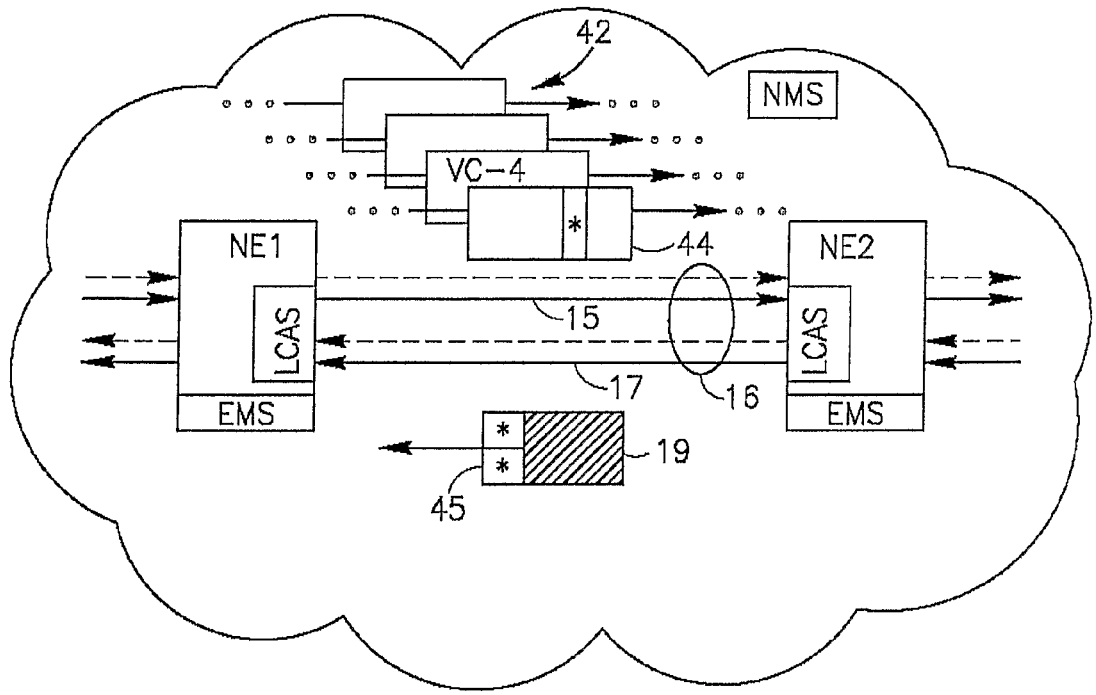
FIG. 3 schematically illustrates another version of the proposed method, where the LCAS control information is transmitted over an existing binary stream, passing via the same bi-directional line between the source and the sink network elements and not related to the unidirectional traffic transmitted via the bi-directional line.

FIG. 3 illustrates yet another version of the method according to the invention. In the network 40, the similar NE1 and NE2 are interconnected by a similar bi-directional line 16 (compare to FIG. 1a). Let us suppose that in the first direction served by a plurality of paths 15 (from NE1 to NE2), a VCG stream 42 is formed from a number of VC-4 transport modules 44 transmitted in parallel via four sub-paths 15. LCAS control information concerning status of each sub-path 15 of the line 16 is transmitted in their POH portion to NE2. Suppose that traffic 19 not related to the traffic 42 exists in the second direction 17 of the bi-directional link 16. The existing binary stream 19 may comprise virtual containers 43 of the same type, or of another type compared to those transmitted in the first direction. At least a single binary stream (not being a member of any VCG stream) is already sufficient for transmitting the LCAS control information about status of sub-paths 15 of the line 16 in the second direction. As mentioned above, bytes which can be used for the purpose, may be any preliminarily agreed overhead bytes. However, if the traffic in the second direction is a VCG stream, the overhead bytes should preferably be not the conventionally specified bytes, in order not to mix LCAS control information of different traffic streams about link 16.

The advantage of using existing traffic for assisting the LCAS communication in cases of unidirectional data transmission is in that there will be no more need in creating and allocating (from the point of bandwidth) separate transport modules for transporting negligible by volume control information in the second direction of the unidirectional traffic. The control information can be now transported by overhead bytes of so-called "foreigner" traffic already existing in the second direction over the bi-directional communication line or over a separate alternative communication trail. The foreigner traffic will therefore give a "lift" to the LCAS control information concerning the bi-directional line.

Figure 4:
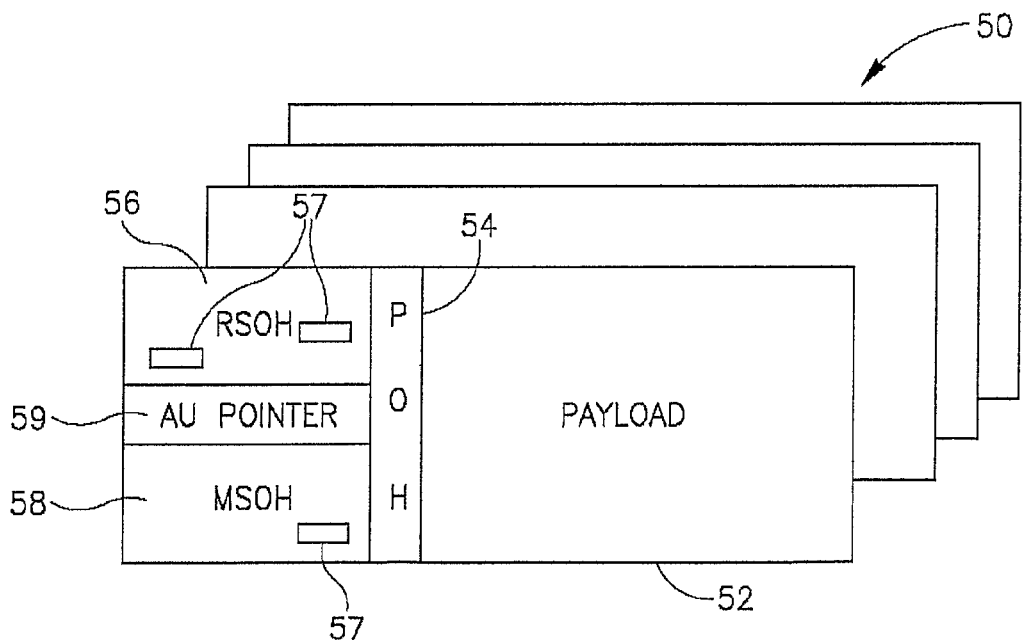
FIG. 4 schematically illustrates an SDH frame format of the existing binary stream, with reserve overhead bytes carrying the LCAS control information in the second direction of the transmission.

FIG. 4 illustrates a frame of an existing traffic module 52. The figure again utilizes an example of a standard SDH frame. However, analogous illustrations could be found for the SONET and the OTH cases. Reserve bytes 57 are located, in this embodiment, in sections RS (56) and MS (58) of the overhead portion of the frame 52. Alternatively, bytes called MS-DCC and/or RS-DCC, respectively located in the MSOH and RSOH sections of TOH (if not in use for their initial purpose) can be used for transmitting LCAS control information in the second direction.

Figure 5:
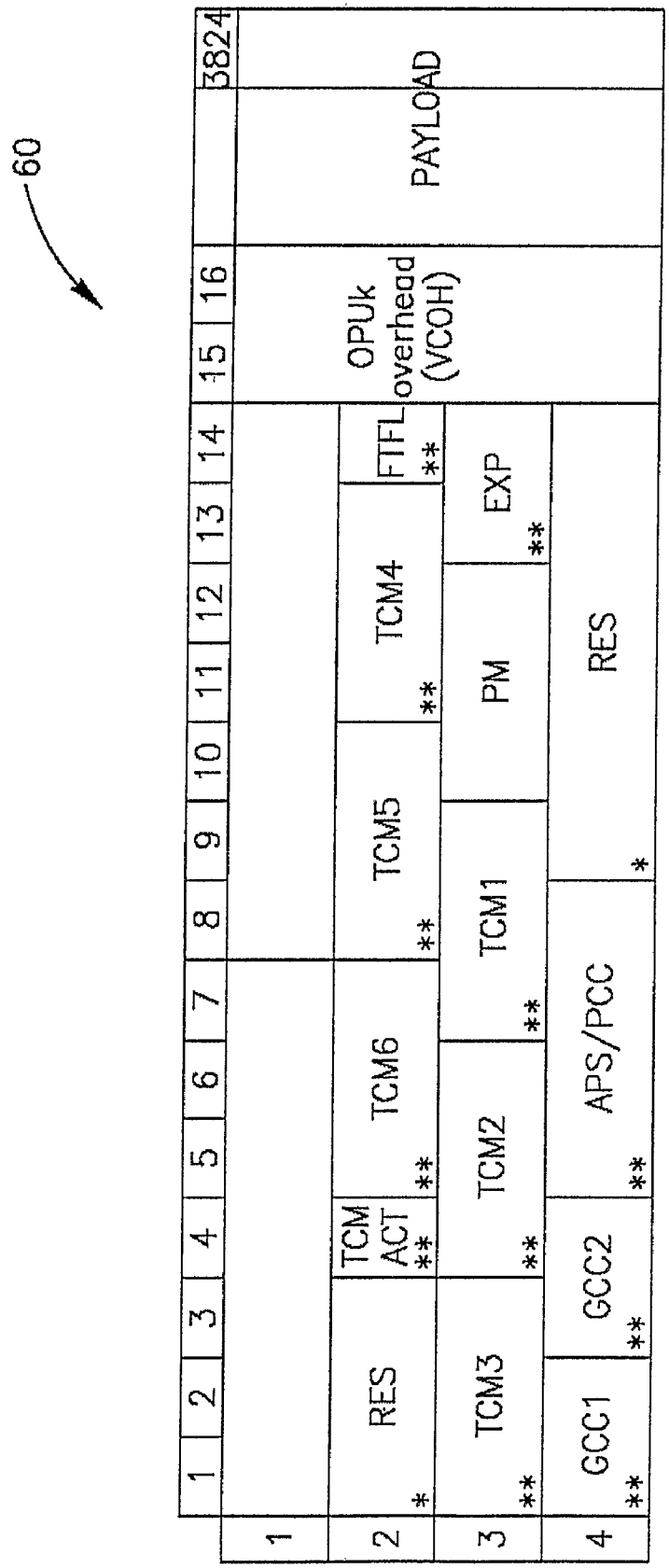
FIG. 5 schematically illustrates an OTH transport module, with reserve bytes of the GCC channel which can be used for transmitting control information on LCAS.

FIG. 5 schematically illustrates an example of illustrates an OTH frame 60. The OPUk overhead portion is also called VCOH portion of the frame and is somehow analogous to POH portion in SDH/SONET standard frames.

In some other portions of the frame a single asterisk symbolizes bytes that can be used for carrying LCAS control information according to the invention, and they can be called reserved bytes.

Bytes marked by double asterisk can be used for transporting LCAS control information as proposed in the invention, if not used for their direct purpose.

It should be appreciated that, though examples in the detailed description show only SDH frames, bytes and SDH-related VCG streams, the principle of the invention applies to the SONET and OTH transport modules, frames, bytes and virtual concatenated groups mutatis mutandis.

The invention claimed is:

1. A method for bidirectional exchange of Link Capacity Adjustment Scheme (LCAS) control information for controlling a virtual concatenated group (VCG) binary stream transmitted between a first network element and a second network element via a bi-directional optical communication line interconnecting said two network elements, while said VCG binary stream forms substantially unidirectional data traffic transmitted in a first direction via said bi-directional optical communication line, with none or negligible data traffic transmitted in a second direction opposite to said first direction;

the method comprising the following arrangement for exchanging the LCAS control information:
a) in the first direction, transmitting said LCAS control information via said bi-directional optical communication line in said VCG binary stream, by placing the LCAS control information in one or more overhead bytes conventionally specified for said VCG binary stream,
b) in the second direction, transmitting said LCAS control information by placing it in one or more overhead bytes of an existing binary stream passing, in said second direction, via a communication trail connecting said first network element and said second network element, wherein said existing binary stream
has no relation to said VCG binary stream to be controlled by said LCAS control information, and
is not provisioned specifically for transmitting said LCAS control information;
wherein the communication trail is an additional communication trail connecting the first network element and the second network element, not forming part of said bi-directional communication line; and
wherein said overhead bytes in the existing binary stream are the conventionally specified bytes of the existing binary stream being a binary stream not forming a member of any VCG.

2. The method according to claim 1, wherein said one or more overhead bytes of said existing binary stream are not the one or more bytes conventionally specified for said VCG binary stream.

3. The method according to claim 2, wherein said overhead bytes in the existing binary stream are unused reserve bytes.

4. The method according to claim 2, wherein said overhead bytes in the existing binary stream are MS-DCC and/or RS-DCC bytes of an SDH/SONET standard frame.

5. The method according to claim 1, wherein said VCG binary stream is formed of transport modules suitable for a communication network selected from among SDH, SONET and OTH networks.

6. The method according to claim 1, wherein the communication trail is a part of said bi-directional communication line.

7. A program product stored on a non-transitory computer readable medium comprising software instructions which, being run on a computer, are capable of providing the method according to claim 1 at network elements of a communication network.

* * * * *